United States Patent [19]

Agusa et al.

[11] 4,313,045
[45] Jan. 26, 1982

[54] MIG ARC WELDING METHOD

[75] Inventors: Kazuo Agusa, Chiba; Noboru Nishiyama, Ichihara, both of Japan

[73] Assignee: Kawasaki Steel Corporation, Kobe, Japan

[21] Appl. No.: 201,408

[22] PCT Filed: Feb. 21, 1980

[86] PCT No.: PCT/JP80/00024
§ 371 Date: Oct. 23, 1980
§ 102(e) Date: Oct. 23, 1980

[87] PCT Pub. No.: WO80/01770
PCT Pub. Date: Sep. 4, 1980

[30] Foreign Application Priority Data

Feb. 23, 1979 [JP] Japan ................................. 54-20577

[51] Int. Cl.³ .......................... B23K 9/16; B23K 35/24
[52] U.S. Cl. ..................................... 219/74; 219/146.1
[58] Field of Search ............................. 219/74, 146.1

[56] References Cited

U.S. PATENT DOCUMENTS

| 2,694,763 | 1/1954 | Muller | 219/74 |
| 2,694,764 | 11/1954 | Muller | 219/74 |
| 3,035,154 | 5/1962 | Wolff | 219/74 |

OTHER PUBLICATIONS

Cary "Modern Welding Technology", Prentice Hall Englewood Cliffs, N.J. 1979, pp. 155 & 156.

*Primary Examiner*—Elliot A. Goldberg
*Attorney, Agent, or Firm*—Balogh, Osann, Kramer, Dvorak, Genova & Traub

[57] ABSTRACT

This disclosure relates to MIG welding. In order to obtain an instantaneous short circuit type of metal transfer in the process using only a pure inert gas shield a small amount of rare earth elements is added to the weld wire. The amount of rare earth added is between 0.02%–0.03% by weight of the wire.

4 Claims, 2 Drawing Figures

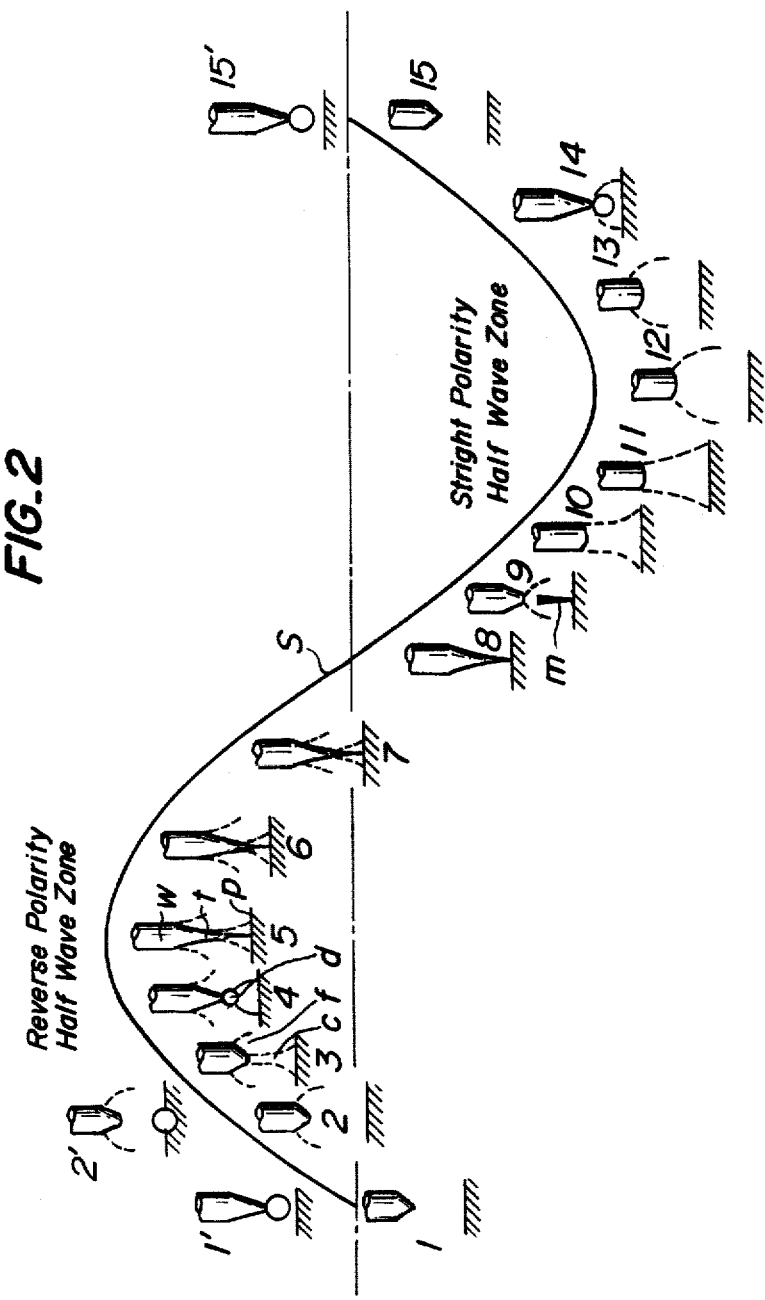

MIG ARC WELDING METHOD

TECHNICAL FIELD

The present invention relates to MIG arc welding method and discloses development of novel welding technic in which by improving the arc stability and the transfer of the molten droplets of the welding wire, MIG arc welding can be carried out with the direct current reverse polarity in pure inert gas atmosphere, and further with the direct current straight polarity without causing any defect, and MIG arc welding with alternating current, can be advantageously accomplished.

BACKGROUND ART

In general, MIG arc welding heretofore has used a mixed gas containing an appropriate amount (usually several %) of active gas, such as oxygen or carbon dioxide gas in an inert gas, such as argon gas in order to stabilize the arc, with positive electrode system, that is direct current reverse polarity wherein a welding torch is connected to a positive electrode of a direct current power supply and a mother metal to be welded is connected to a negative electrode.

The reason why the above described active gas component should be mixed in the shield gas is as follows. The first reason is that in the pure inert gas atmosphere added with no active gas component, arc roots (cathode spots) do not take fixed positions on mother plates to be welded and moves around on the mother plate surface sputtering from mill scales present on the mother metal surface, so that the arc trembles, the welding wire is irregularly fused and therefore the satisfactory welding result cannot be obtained. The second reason is that in the welded metal obtained with the arc as described above, the finger-shape weld penetration is formed at the bottom of a weld puddle and at this portion, the insufficient fusion, slag inclusion, blow holes and other welding defects are caused and the mixing of the active gas component has been only one means for preventing these defects.

In view of insurance of safety of welded joints, the above described defects cannot be accepted, so that as the means for obtaining the sound welded joints having no such defects, it has been essential to add an appropriate amount of active gas to an inert gas to stabilize the arc and prevent the defects.

The mixing ratio of the active gas is not always constant depending upon the object of welding, the kind of welding wire and the mother metal to be welded but, for example, it has been well known that Sigma grade argon (Linde Co. Ltd. U.S.A.) containing 1~5% of oxygen in argon gas is well-known and is effective to transfer the molten droplets at the wire tip in spray form.

Thus, the mixing of the above described active gas to the inert gas is effective for stabilizing the welding arc and preventing the welding defects. However, the oxygen content in the welded metal is inevitably increased and, for example, in the welding of 9% Ni steel requiring a high toughness at an ultra low temperature of about $-196°$ C. by using a wire having similar composition of a mother metal (ferritic wire), this increase of oxygen amount cannot satisfy the requirement of the toughness and the mixing of the active gas is not accepted in the welding wherein the toughness is particularly important.

As mentioned above, the prior MIG arc welding has practically used only with the direct current reverse polarity, because the molten droplets of the wire is smoothly transferred to the mother metal to be welded only with the reverse polarity and the good welded bead is formed, while, with the direct current straight polarity wherein the welding torch is connected to a negative electrode of the direct current power supply and the mother metal to be welded is connected to a positive electrode, a strong arc force acts against the molten droplets of the wire to push up the molten droplets, so that the molten droplets are transferred to the mother metal in such a form that the molten droplets are torn off, and result in large spatters and the formation of practically usable beads is substantially impossible.

In the alternating current MIG arc welding wherein the polarity is periodically alternated, the molten droplets are unstably transferred in the half wave wherein the polarity becomes the straight polarity and hence the formation of the good head is hampered, and further when the current value becomes zero at the alternating points, where the arc is once suppressed, a high voltage of about 300 V is necessary as a reignition voltage to reignite the arc and a large capacity of welding power supply is needed and therefore the danger when the welding operator is attacked by the electric shock is high, so that the above described high voltage power supply is not practically accepted.

From the above described reasons, MIG arc welding in the direct current straight polarity or alternating current has never been practically taken into consideration.

The present invention aims to provide MIG arc welding method in pure inert gas atmosphere in which the welding arc is stabilized and the molten droplets of the wire are smoothly transferred to the molten pool on the mother metal, in the direct current reverse polarity, the direct current straight polarity and the alternating current.

DISCLOSURE OF INVENTION

The inventors have carried out a variety of experiments in order to prevent the irregular movement of the cathode spots with the direct current reverse polarity and found that it is necessary to transfer the molten droplets at the wire tip through the instantaneous short-circuit between the wire tip and the surface of the molten pool.

However, with welding wires having normal chemical compositions, it is generally difficult to stably maintain the above described instantaneous short-circuit in pure argon gas atmosphere; the wire thrusts into the molten pool to form spatters, otherwise the unstable spray arc accompanied by the irregular motion of cathode spots is formed.

The inventors have found after a large number of trials and errors that it is effective to add not less than 0.02 weight% of rare earth elements to a welding wire for causing instantaneous repetition of the stable short-circuit between the molten droplets at the wire tip and the molten pool surface.

When such a welding wire is used together with pure argon gas which is a typical example of pure inert shielding gas, the wire tip is sharpened by the arc with the direct current reverse polarity to form a reverse conical shape having a sharp vertex angle and the sharpened wire tip is instantaneously short-circuited with the molten pool surface stably, repeatedly and continuously. When the amount of rare earth elements added is less than 0.02% in weight, the above described sharpening and the stable metal transfer based on the instantaneous short-circuit are not caused, while when said amount exceeds 0.30% in weight, non-metallic inclusions in the welded metal are increased resulting into deterioration of the toughness, so that the rare earth addition should be in the range from 0.02 to 0.30% in weight.

Thus, according to the present invention, MIG arc welding can be stably carried out with direct current reverse polarity, straight polarity and alternating current in pure inert gas atmosphere and in any case, it is not necessary to add active gas, such as oxygen, carbon dioxide gas and the like to an inert gas for the stabilization of arc, whereby the amount of oxygen in the welded metal is decreased and the toughness is conspicuously improved and any welding defect is not caused.

BRIEF EXPLANATION OF DRAWINGS

FIG. 2 is a schematic illustration of the metal transfer and the arc configuration when an alternating current is applied.

BEST MODE OF CARRYING OUT THE INVENTION

Figure 1:
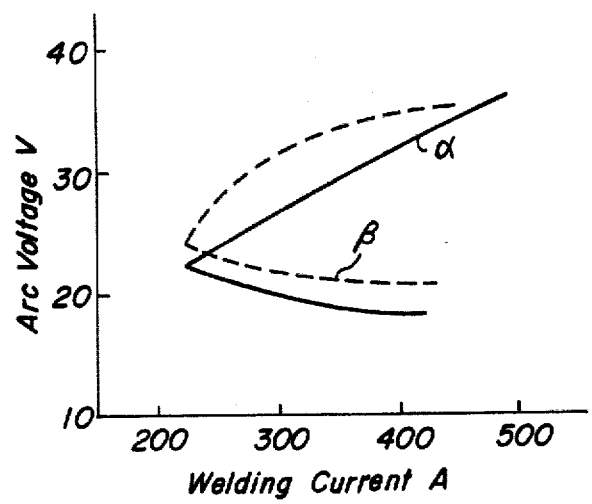
FIG. 1 is a graph showing stable operation ranges with respect to welding current and arc voltage according to the present invention.

By using a welding wire containing an appropriate amount of rare earth elements, pure argon shielding gas and an ordinary welding power supply, tests were carried out to determine stable operation ranges with respect to the relation of the welding current to the arc voltage for maintaining the instantaneous short-circuit transfer and a quite satisfactory welded bead. The zone defined by a solid line $\alpha$ in FIG. 1 is representing a stable operation range obtained with reverse polarity. The wire used was the one containing 0.10% of rare earth elements and having a diameter of 1.2 mm. Although the above described conditions are more or less varied depending upon the wire diameter and the current value, at the zone below the lower solid line in FIG. 1, the wire thrusts into the molten pool, while at the zone above the upper solid line, the arc becomes unstable. The range as defined by the upper and lower solid lines, wherein the molten droplets are stably transferred through the instantaneous short-circuit, is extended as shown in FIG. 1 by the addition of rare earth elements to the wire. This is a greatly different characteristic from the pure argon shielded conventional MIG arc welding with direct current reverse polarity, wherein the wire thrusts suddenly into the molten pool in the course of lowering arc voltage from the value at which an irregular spray arc is formed.

The addition of rare earth elements shows the noticeable contribution to the above described arc stabilization with an amount of more than 0.02% in weight, but when said amount exceeds 0.30% in weight, non-metallic inclusions in the welded metal are increased and the toughness is deteriorated, so that the amount of rare earth addition should be from 0.02 to 0.30% in weight.

The addition of rare earth elements is preferably made in the form of Mischmetal which consists of about 50% Ce and 25% La, and it is convenient that the content of rare earth elements in the welding wire is represented by the Ce amount and thus the above described addition amount is determined.

When the welding wire added with an appropriate amount of rare earth elements as mentioned above is applied to MIG arc welding with the direct current straight polarity, it has been found that the great problem when using a welding wire having a prior normal composition, that is, the molten droplets at the wire tip melted by arc heat are pushed up by strong arc force to form a large lump and are not smoothly transferred to the mother metal, is advantageously overcome and the molten droplets are smoothly transferred by the instantaneous short-circuit. In addition, it has been found that welding conditions causing such a specific transfer of the molten droplets are within the range defined with the upper and lower broken line $\beta$ in FIG. 1. The critical value of the amount of rare earth elements added, which suppresses the growth of the molten droplets at the wire tip and causes the smooth transfer based on the instantaneous short-circuit, is the same as that with the direct current reverse polarity.

In alternating current MIG arc welding, in which the straight polarity and the reverse polarity are periodically alternated, the welding phenomena are understood as the combination of phenomena with the straight polarity and those with the reverse polarity, by as already mentioned, the arc is once suppressed at the alternating points between two polarities, so that a very high voltage is necessary for reigniting the arc. However, it has been found that the welding wire added with 0.02 to 0.30% in weight of rare earth elements can considerably reduce the above described reignition voltage and the molten droplets at the wire tip are transferred to the molten pool by the instantaneous short-circuit, whereby the stabilization of alternating current MIG arc welding can be advantageously attained. In this case, the preferred range of the welding voltage and current is the zone between the upper side solid line $\alpha$ and the lower side broken line $\beta$.

When the content of rare earth elements is less than 0.02% in weight, the arc and the metal transfer are not stabilized in the direct current welding, and it is impossible to reduce reignition voltage in the alternating current welding. On the other hand, when the content exceeds 0.30% in weight, non-metallic inclusions in the welded metal are increased and the toughness is deteriorated.

When welding is carried out conforming to the various conditions of the present invention, the resulting weld quality has nothing to do with the basic chemistry of the welding wires to be used, and the effect of the present invention can be developed with any kind of usually used wires. The term "usually used wires" used herein means usual steel wires having the basic compositions of $C \leq 0.20\%$ in weight, $Si \leq 1.00\%$ in weight, $Mn \leq 2.50\%$ in weight, and P and $S \leq 0.030\%$ in weight or alloy steel wires containing at least one of $Ni \leq 20\%$ in weight, $Cr \leq 30\%$ in weight and $Mo \leq 10\%$ in weight in addition to the above described components.

Explanation will be made hereinafter with respect to examples wherein the welding was carried out according to the present invention by using six kinds of wires containing 0~0.36% in weight of rare earth elements. The steel plates used in the test were mild steel plates having the thickness of 20 mm, and mill scales on the plate surface have been completely removed prior to welding. The welding rate and the flow rate of shield gas were held constant at 60 cm/min and 40 l/min, respectively.

TABLE 1

| Wire No. | (% in weight, wire diameter 1.2 mm) | | | | | Total RE |
|---|---|---|---|---|---|---|
| | C | Si | Mn | P | S | |
| 1 | 0.07 | 0.68 | 1.31 | 0.010 | 0.007 | — |
| 2 | 0.06 | 0.70 | 1.25 | 0.008 | 0.007 | 0.02 |
| 3 | 0.06 | 0.65 | 1.28 | 0.005 | 0.005 | 0.10 |
| 4 | 0.05 | 0.64 | 1.30 | 0.006 | 0.006 | 0.20 |
| 5 | 0.06 | 0.67 | 1.28 | 0.006 | 0.005 | 0.30 |
| 6 | 0.05 | 0.67 | 1.30 | 0.006 | 0.006 | 0.36 |

Note:
RE: Mischmetal was used. Total RE is shown by an amount of 2 times of the analyzed Ce value.

Table 2 shows the examples of welding carried out by using the direct current reverse polarity in pure argon shield.

TABLE 2(a)

| Wire No. | Content of rare earth element (wt. %) | Welding conditions set | | Welding conditions measured | | Arc phenomena, metal transfer phenomena, and other matters | Judgement of welding result |
|---|---|---|---|---|---|---|---|
| | | Feeding rate of wire (m/min) | Arc voltage (V) | Welding current (A) | Arc voltage (V) | | |
| 1 | — | | | 220 | 34.0 | Wire thrust. Unstable arc. Conspicuous spatter. Set conditions cannot be represented. | x |
| 2 | 0.02 | | | 340 | 25.0 | Instantaneous short-circuit. Stable arc. | o |
| 3 | 0.10 | 10 | 25.0 | 340 | 25.0 | Instantaneous short-circuit. Stable arc. | o |
| 4 | 0.20 | | | 340 | 25.0 | Instantaneous short-circuit. Stable arc. | o |
| 5 | 0.30 | | | 340 | 25.0 | Instantaneous short-circuit. Stable arc. | o |
| 6 | 0.36 | | | 340 | 25.0 | Instantaneous short-circuit. Stable arc. But cleanliness of welded metal is poor. Toughness is deteriorated. | x |

TABLE 2(b)

| Wire No. | | Content of rare earth element (wt. %) | Welding conditions set | | Welding conditions measured | | Arc phenomena, metal transfer phenomena, and other matters | Judgement of welding result |
|---|---|---|---|---|---|---|---|---|
| | | | Feeding rate of wire (m/min) | Arc voltage (V) | Welding current (A) | Arc voltage (V) | | |
| | a | | | 17.5 | 300 | 17.5 | Wire thrust. Conspicuous spatter. | x |
| 3 | b | 0.10 | 10 | 22.5 | 330 | 22.5 | Instantaneous short-circuit. Stable arc. | o |
| | c | | | 32.5 | 370 | 32.5 | Spray transfer. Wire tip trembles. Cathode spots tremble. Zigzag bead. | x |

With the wire (No. 1) containing no rare earth element, the wire tip thrusts into the molten pool and conspicuous spatters occur. From the observation of the arc voltage wave form, many interruptions of the arc based on the wire thrusting, that is the occurrence of no load voltage, were found and as the result, the higher arc voltage than the set value was measured as seen in Table 2. In order to avoid the wire thrusting phenomenon, welding was attempted by gradually increasing the set arc voltage. At arc voltage values higher than a certain critical voltage, the wire thrusting phenomenon was solved, however the wire tip unstably trembled in spray form and it was impossible to find out a stable zone of the instantaneous short-circuit.

When the welding was carried out by using the wires (Nos. 2~5) containing 0.02~0.30% in weight of rare earth elements, the molten droplets were stably transferred by the instantaneous short-circuit and the very good welds were obtained. The measured welding conditions were roughly equal to the set values.

When the amount of rare earth elements added was increased to 0.36% in weight (wire No. 6), the welding arc itself was stable and the appearance of the welded bead was good, but the cleanliness of the welded metal was considerably deteriorated and as the result, toughness of the welded metal was degenerated.

In the examples wherein the arc voltage was varied by using the wire (No. 3) containing 0.10% in weight of rare earth elements, at an arc voltage of 17.5 V, practically usable beads were not obtained because the wire thrusts into the molten pool and therefore spatters occurred, but such an unstable phenomenon that the set conditions cannot be represented as seen with the wire No. 1 containing no rare earth elements, was not found. When the arc voltage was 22.5 V, the sharpened wire tip was short-circuited with the molten pool surface in the very stable form to obtain the good welded bead. When the arc voltage was further raised to 32.5 V, the short-circuit at the wire tip was not stably maintained and the wire tip and the cathode spots unstably trembled, so that it was impossible to continue the stable welding (the data shown in Table 2 comply to the phenomenon with the direct current reverse polarity in FIG. 1).

The following Table 3 shows the welding examples when the direct current straight polarity was used in a pure argon shield gas.

added was increased to 0.36% in weight, although the stability of the arc itself and the appearance of the bead were good, a large amount of non-metallic inclusions were included in the welded metal and the toughness of the welded metal was deteriorated.

When the arc voltage was varied by using the wire

TABLE 3(a)

| Wire No. | Content of rare earth element (wt. %) | Welding conditions set | | Welding conditions measured | | Arc phenomena, metal transfer phenomena, and other matters | Judgement of welding result |
|---|---|---|---|---|---|---|---|
| | | Feeding rate of wire (m/min) | Arc voltage (V) | Welding current (A) | Arc voltage (V) | | |
| 1 | — | | | 160 | 40.0 | A large lump of molten metal is formed at the wire tip and is not transferred smoothly to mother metal. Very unstable arc. | x |
| 2 | 0.02 | | | 315 | 25.0 | Instantaneous short-circuit. Stable arc. | o |
| 3 | 0.10 | 10 | 25.0 | 315 | 25.0 | Instantaneous short-circuit. Stable arc. | o |
| 4 | 0.20 | | | 315 | 25.0 | Instantaneous short-circuit. Stable arc. | o |
| 5 | 0.30 | | | 315 | 25.0 | Instantaneous short-circuit. Stable arc. | o |
| 6 | 0.36 | | | 315 | 25.0 | Instantaneous short-circuit. Stable arc. But cleanliness of welded metal is poor. Toughness is deteriorated. | x |

TABLE 3(b)

| Wire No. | | Content of rare earth element (wt. %) | Welding conditions set | | Welding conditions measured | | Arc phenomena, metal transfer phenomena, and other matters | Judgement of welding result |
|---|---|---|---|---|---|---|---|---|
| | | | Feeding rate of wire (m/min) | Arc voltage (V) | Welding current (A) | Arc voltage (V) | | |
| 3 | a | 0.10 | 10 | 20.0 | 290 | 20.0 | Wire thrust. Conspicuous spatter. | x |
| | b | | | 27.5 | 320 | 27.5 | Instantaneous short-circuit. Stable arc. | o |
| | c | | | 35.0 | 345 | 35.0 | Small grained molten droplets scatter in all directions. Uniform beads are not formed. | x |

When the wire (No. 1) containing no rare earth elements was used, it was difficult to transfer the molten droplets to the mother metal because of the strong arc force and hence the molten droplets grew to a large lump at the wire tip and scattered irregularly, and further the arc itself was very unstable and it was difficult to represent the set conditions. When the wires (Nos. 2~5) containing rare earth elements within the range of 0.02~0.30% in weight, the arc force was weakened due to the stabilizing effect of the rare earth elements on cathode spots and the molten droplets at the wire tip were smoothly transferred accompanying the instantaneous short-circuit to obtain the very stabilized bead. However, when the amount of rare earth elements (No. 3) containing 0.10% in weight of rare earth elements, in the case of 20.0 V, the wire thrust into the molten pool and in the case of 35.0 V, small grains of molten droplets were transferred in the form that they scattered in all directions, so that practically usable bead was not obtained. However, at the intermediate voltage of 27.5 V, the instantaneous short-circuit was stably maintained and the very good welded bead was obtained (the data in Table 3 correspond to the phenomenon in the direct current straight polarity in FIG. 1).

The following Table 4 shows the examples when the welding was carried out by using alternating current in pure argon shield.

TABLE 4(a)

| Shield gas | Wire No. | Content of rare earth element (wt. %) | Welding conditions set | | Welding conditions measured | | Arc phenomena, metal transfer phenomena, and other matters | Judgement of welding result |
|---|---|---|---|---|---|---|---|---|
| | | | Feeding rate of wire (m/min) | Arc voltage (V) | Welding current (A) | Arc voltage (V) | | |
| | 1 | — | | | — | — | Arc reignition is | x |

TABLE 4(a)-continued

| Shield gas | Wire No. | Content of rare earth element (wt. %) | Welding conditions set | | Welding conditions measured | | Arc phenomena, metal transfer phenomena, and other matters | Judgement of welding result |
|---|---|---|---|---|---|---|---|---|
| | | | Feeding rate of wire (m/min) | Arc voltage (V) | Welding current (A) | Arc voltage (V) | | |
| | 2 | 0.02 | | | 345 | 26.0 | impossible. Welding is impossible. Instantaneous short-circuit. Reignition voltage is low. Stable arc. | o |
| Pure argon | 3 | 0.10 | 10.8 | 26.0 | 345 | 26.0 | Instantaneous short-circuit. Reignition voltage is low. Stable arc. | o |
| | 4 | 0.20 | | | 345 | 26.0 | Instantaneous short-circuit. Reignition voltage is low. Stable arc. | o |
| | 5 | 0.30 | | | 345 | 26.0 | Instantaneous short-circuit. Reignition voltage is low. Stable arc. | o |
| | 6 | 0.36 | | | 345 | 26.0 | Instantaneous short-circuit. Reignition voltage is low. Stable arc. But cleanliness of welded metal is poor and toughness is deteriorated. | x |

TABLE 4(b)

| Shield gas | Wire No. | | Content of rare earth element (wt. %) | Welding conditions set | | Welding conditions measured | | Arc phenomena, metal transfer phenomena, and other matters | Judgement of welding result |
|---|---|---|---|---|---|---|---|---|---|
| | | | | Feeding rate of wire (m/min) | Arc voltage (V) | Welding current (A) | Arc voltage (V) | | |
| | | a | | | 20.0 | 300 | 20.0 | Wire thrust. Unstable arc. Conspicuous spatter. | x |
| Pure argon | 3 | b | 0.10 | 10.8 | 25.0 | 340 | 25.0 | Instantaneous short-circuit. Reignition voltage is low. Stable arc. | o |
| | | c | | | 35.0 | 400 | 35.0 | Wire tip trembles. Unstable arc. Zigzag bead. | x |

From these examples, it can be understood that the effect of the addition of rare earth elements for stabilizing alternating current MIG arc can be attained.

The features of the alternating current arc are that, when the wire (No. 1) containing no rare earth elements is used, the reignition of arc is not stably conducted, so that the continuation of welding is quite impossible. However, when the wires (Nos. 2~5) containing 0.02 to 0.30% in weight of rare earth elements are used, the arcs in both negative and positive half wave zones are stabilized and also the reignition characteristics at the alternating points are stabilized and the very high quality can be furnished to the resulting welds. When the content of rare earth elements is increased to 0.36% in weight, the cleanliness of the welded metal is deteriorated and such a welding is not practical.

When the welding was carried out by varying arc voltage using the wire (No. 3) containing 0.1% in weight of rare earth elements, the arc voltage of 20.0 V was too low to prevent the wire thrusting into the molten pool and the good welded bead was not obtained, and the arc voltage of 35.0 V was too high to maintain the instantaneous short-circuit and the wire tip trembled, so that the good welded bead was not obtained. In contrast to these, the intermediate voltage of 25.0 V stably maintained the instantaneous short-circuit and the good welded bead was obtained.

FIG. 2 is a schematic illustration of the metal transfer phenomena and the arc behavior during one cycle of the alternating current MIG arc welding in pure argon gas.

In FIG. 2, s shows a welding current wave shape, w shows a welding wire containing an appropriate amount of rare earth elements, p shows a molten pool surface formed on a mother metal to be welded, zones c and f indicated by broken lines are primary arc and secondary arc respectively, d shows a molten droplet formed at the welding wire tip by arc heat and t shows a wire tip when causing instantaneous short-circuit.

The numbers in FIG. 2 correspond to each instant along time axis of the welding current wave s and shows the behaviors of arc and metal transfer in the order of current variation. Furthermore, 1', 2' and 15' show one embodiment of the state different from the case of 1, 2 and 15.

The left half in FIG. 2 shows the half wave in the reverse polarity and at the beginning of the said zone 1~4, the wire tip w is melted by the arc heat and a molten droplet d transfers to the molten pool hanging from the partly sharpened wire tip, and after the metal transfer the wire tip w is fully sharpened at the time point 5. Thus in the last period 5 to 7 in the above described half wave zone, the sharpened tip touches the surface of the molten pool and maintains stable instantaneous short-circuits. Almost all the molten metal is transferred to the mother plate through this instantaneous short-circuits with the frequency of about 250 cycles.

When the present invention is applied to the alternating current MIG arc welding, the major part of the metal transfer occurs during the last half of the reverse polarity period and the transfer of the molten droplets during the straight polarity period is very few as follows.

That is, at the time point 8 where the polarity is alternated from the reverse polarity to the straight polarity, the arcs c and f disappear and at this instant the sharpened wire tip w remains and at the time point 9 immediately after having entered in the straight polarity, the arc f is reignited at the root of the sharpened tip m which is subsequently fused down. Thereafter, there is no noticeable variation in welding phenomena along the time points 10~13 and the molten droplet d accumulated at the wire tip w during the last half of the straight polarity is either transferred to the mother metal at the time point 14, or retained without transferring. After the time point 15 or 15', that is, during the next reverse polarity period, the already mentioned course is passed through or the molten drop is transferred at the time point 2' and then the same course as mentioned above is taken.

In the MIG arc welding of the direct current reverse polarity, the instantaneous short-circuit transfer as shown at the time points 5~7 in FIG. 2 is continued, while in the case of the direct current straight polarity, the instantaneous short-circuit transfer as shown in the time point 14 in FIG. 2 is stably continued at a frequency of about 60 cycles.

In the above described examples, the effect of the present invention has been explained with respect to the test specimens of mild steel, but the present invention can also be advantageously applied to all alloy steels, such as 9% Ni steel as mentioned hereinbefore and in this case substantially the same effect can be obtained.

Industrial Applicability

In the application to the alternating current MIG arc welding, the welding can be satisfactorily carried out by an alternating current power supply for manual metal arc welding, which is cheapest as a welding power supply and it is not necessary to install an expensive direct current welding power supply and in particular, in the alternating current MIG arc welding, the current flows pulsatory, so that the alternating current MIG arc is hardly subjected to the adverse influence of the outer magnetic field (for example, residual magnetism of the mother metal) as in the direct current arc and the problem of magnetic arc blow can be solved and further the reignition voltage is low, so that welding arc can be stabilized even with a low no-load voltage of the power supply. Accordingly, no specific apparatus is needed to stabilize the reignition characteristics and the danger of electric shock can be minimized.

We claim:

1. MIG arc welding method comprising carrying out the welding by using a welding wire containing 0.02 to 0.30% in weight of rare earth elements as a welding arc stabilizing component in a pure inert shield gas, whereby a molten droplets formed at the wire tip by arc heat in the shield gas are transferred to molten metal pool surface on mother plates by instantaneous short-circuit between the wire tip and the molten metal pool surface.

2. The method as claimed in claim 1, wherein a polarity of the welding arc is direct current reverse polarity.

3. The method as claimed in claim 1, wherein a polarity of the welding arc is direct current straight polarity.

4. The method as claimed in claim 1, wherein a welding current is alternating current.

* * * * *